United States Patent [19]
Chiodini et al.

[11] Patent Number: 5,648,429
[45] Date of Patent: Jul. 15, 1997

[54] CURABLE FLUOROELASTOMERIC COMPOSITIONS

[75] Inventors: Graziella Chiodini, Saronno; Vincenzo Arcella, Novara, both of Italy

[73] Assignee: Ausimont S.p.A., Milan, Italy

[21] Appl. No.: 451,075

[22] Filed: May 25, 1995

[30] Foreign Application Priority Data

May 27, 1994 [IT] Italy .................... MI94A1081

[51] Int. Cl.$^6$ .................................. C08F 8/32
[52] U.S. Cl. .............. 525/340; 525/326.3; 525/351; 525/353; 525/359.1; 525/359.3; 525/379; 525/380
[58] Field of Search ............. 525/340, 359.1, 525/359.3, 379, 380, 381, 353

[56] References Cited

U.S. PATENT DOCUMENTS

| | | |
|---|---|---|
| 3,291,843 | 12/1966 | Fritz et al. . |
| 3,712,877 | 1/1973 | Patel et al. . |
| 4,259,463 | 3/1981 | Moggi et al. . |
| 4,789,717 | 12/1988 | Giannetti et al. . |
| 5,262,490 | 11/1993 | Kolb et al. . |

FOREIGN PATENT DOCUMENTS

| | | |
|---|---|---|
| 0196904A2 | 10/1986 | European Pat. Off. . |
| 0250767A1 | 1/1988 | European Pat. Off. . |
| 0280312A2 | 8/1988 | European Pat. Off. . |
| 0333062A1 | 9/1989 | European Pat. Off. . |
| 0335705A1 | 10/1989 | European Pat. Off. . |
| 0337705A2 | 10/1989 | European Pat. Off. . |
| 0339126A1 | 11/1989 | European Pat. Off. . |
| 0360292A2 | 3/1990 | European Pat. Off. . |
| 0404411A1 | 12/1990 | European Pat. Off. . |
| 0407937A1 | 1/1991 | European Pat. Off. . |
| 0525685A1 | 2/1993 | European Pat. Off. . |

OTHER PUBLICATIONS

Kirk–Othmer, Encyclopedia of Chemical Technology, 3rd Ed., vol. 8, John Wiley & Sons, Inc., 1979, pp. 500–515.
Chemical Abstracts, vol. 99, No. 18, Abstract No. 141361, Columbus, Ohio, (Oct. 31, 1983), Abstract of Nudel'man, et al. "Reason for the accumulation of compression set by SKF–26–bisphenol vulcanizates".
Chemical Abstracts, vol. 113, No. 12, Abstract No. 99190, Columbus, Ohio, (Sep. 17, 1990), Abstract of JP–A–10 315 449 (Nippon Mectron, Ltd.) Dec. 20, 1989.
Chemical Abstracts, vol. 93, No. 25, Abstract No. 239650, Columbus, Ohio, (Dec. 22, 1980), Abstract of JP–A–55 108 884 (Nippon Oil Seal Industry Co., Ltd.), Aug. 21, 1980.

*Primary Examiner*—Bernard Lipman
*Attorney, Agent, or Firm*—Finnegan, Henderson, Farabow, Garrett & Dunner

[57] ABSTRACT

Curable flurooelastomeric compositions used for O-rings comprising:

A) parts (phr) of a curable fluoroelastomeric copolymer having a content in F<67% by weight and comprising from 40 to 68% by weight of VDF units, from 20 to 50% by weight of HFP units, the sum being 100, and optionally one or more comonomers having ethylene unsaturation, said copolymer having a number of ionic terminals of at least 0.5 for chain;

B) from 1 to 5 phr of an adduct between an accelerator and a curing agent in molar ratio from 1:3 to 1:5, the accelerator being an onio-organic compound having a positive charge, the curing agent being a di- or polyhydroxy or di- or polythiol compound; the adduct being obtained by melting of the reaction product between accelerator and curing agent in the indicated molar ratios, or by melting of the adduct mixture 1:1 added with the curing agent in the indicated amounts.

16 Claims, No Drawings

CURABLE FLUOROELASTOMERIC COMPOSITIONS

The present invention relates to curable fluoroelastomeric compositions having a low content in fluorine based on vinylidenefluoride (VDF) copolymers, and on at least one or more fluorinated or partially fluorinated monomers having ethylene insaturation.

More particularly, the invention refers to curable fluoroelastomeric compositions based on fluoroelastomers having a content in F lower than 67% by weight, comprising units deriving from vinylidenefluoride (VDF) and hexafluoropropene (HFP), optionally tetrafluoroethylene (TFE) in amounts up to 10% by weight, vinylethers and hydrogenated olefins; said fluoroelastomeric compositions having high elastomeric characteristics, such as low compression set, combined with good processability and good mechanical properties.

In particular the fluoroelastomeric compositions of the present invention are used to prepare O-rings showing the combination of the above mentioned properties.

Fluoroelastomer compositions for O-rings using vinylydenfluoride copolymers endowed with high elastomeric characteristics at low and high temperatures is known in the art. See for instance EP patent application 525685 in the name of the Applicant.

It is known that for obtaining fluoroelastomers with good elastic properties it is necessary to use chain transfer agents in polymerization and moreover to use the minimum amount of initiator.

However, under these conditions the stability of the emulsion used in polymerization is very weak, wherefore it is necessary to use high cost surfactants, such as for instance, perfluorooctanoates or sulphonates.

The drawback of these fluoroelastomeric compositions is that the mechanical properties are not high, even though they show good elastomeric properties, for instance a low compression set if compared with polymers having the same molecular weight.

It is also known to obtain copolymers based on VDF by peroxidic curing. However, the compression set values are worsened with respect to copolymers of the cited prior art.

It is also known to prepare fluoroelastomeric rubbers having high mechanical properties by using in polymerization high amounts of initiator and a chain transfer agent in small amounts or without adding any chain transfer.

The disadvantage of these elastomeric compositions is that they show both poor elastomeric properties and poor processability in molding both by injection and by extrusion.

The accelerating and crosslinking agents which can be used are numerous in the art as indicated hereinafter, however it is not known the preparation of curable vinylidenefluoride copolymers to be used for O-rings showing the combination of improved processability, that is, low blends viscosity
lower scorchability, therefore greater safety during the processing of the fluoroelastomeric composition
good elastomeric properties, in particular improved compression set
good mechanical properties, in particular improved tensile strength.

It has unexpectedly and surprisingly been found that it is possible to prepare cured fluoroelastomeric compositions having high mechanical properties (high tensile strength), combined with high elastomeric properties (low compression set) and good processability if the curing system of the present invention, as specified hereinafter, is used.

Object of the present invention are curable fluoroelastomeric compositions comprising
A) 100 parts (phr) of a curable fluoroelastomeric copolymer having a fluorine content less than 67% by weight and comprising from 40 to 68% by weight of VDF units, from 20 to 50% by weight of HFP units, the sum being 100, and optionally one or more comonomers having ethylene unsaturation, said copolymer having a number of ionic terminals of at least 0.5 for chain. The ionic copolymer can be obtained by polymerization wherein an inorganic polymerization initiator is employed, optionally in the presence of small amounts of a transfer agent.

Preferably the other comonomers are from 0 to 9% by weight of PAVE (perfluoroalkylvinylether) units, from 0 to 10% by weight of TFE units and from 0 to 20% by weight of hydrogenated olefin containing up to 4 carbon atoms.

B) from 1 to 5 phr, preferably from 2 to 4,5, of an adduct between an accelerator and a crosslinking agent in molar ratio from 1:3 to 1:5, preferably from 1:4 to 1:5, the accelerator being an onio-organic compound having a positive charge, the curing agent being a di- or or polyhydroxy or di- or polythiol compound; the adduct being obtained by melting of the reaction product between accelerator and curing agent in the indicated molar ratios, or by melting of the adduct mixture 1:1 added with the curing agent in the specified amounts. optionally C) the accelerator indicated in B) in amounts from 0.05 to 0.5 phr.

The onium compound used as accelerator in B) and C) and forming the adduct cation is generally selected from the following classes:

I) aminophosphoonium $[P(NR'R'')_n(R^1\ R^2\ R^3)_{4-n}]^+$ wherein n is an integer from 1 to 3;
R', R" and $R^1\ R^2\ R^3$, equal or different from each other, are alkylic, cycloalkylic, arylic, arylalkylic, oxyalkylic or polyoxyalkylic groups having a free or esterified terminal —OH function;
R' and R" contain from 1 to 7 carbon atoms and can be linked each other so as to form an heterocyclic ring with the nitrogen atom while $R^1$, $R^2$, $R^3$ equal or different from each other contain from 1 to 18 carbon atoms;

II) compounds having the formula $$Q^+(R^aR^bR^cR^d)_4$$

wherein Q is selected from nitrogen, phosphorus, arsenic, antimonium;

(III) compounds having the formula $$S^+(R^aR^bR^c)_3$$

wherein in II) and III) $R^a$, $R^b$, $R^c$, $R^d$ are selected from alkyls, aryls, alkylaryls or their combinations, two of said free radicals can be linked each other and the Q or S atom can form an heterocyclic ring.

Preferred compounds are quaternary phosphonium compounds containing at least a phosphorus atom linked through four covalent simple bonds to four organic radicals, the organic radicals generally containing from 1 to 30 carbon atoms, preferably from 2 to 8. The organic radical, being linear or branched, can contain heteroatoms.

Preferred compounds are triphenylbenzylphosphonium, tetrabutylphosphonium,

The accelerator can be also a blend of the compound of the single classes I) to III), or of more compounds of the same class.

The anion forming the adduct must be a curing agent and is generally selected from the polyhydroxy or polythiol compounds comprising the following classes:

X1) $A(BH)_m$ wherein A is an arylene radical optionally substituted with alkylic groups, such radical including the alkyl groups has from 6 to 14 carbon atoms, B is oxygen or sulphur and m is equal to 2 or 3.

X2) $HB—R^{4a}—BH$ wherein $R^{4a}$ is an alkylene or cycloalkylene radical optionally substituted with alkylic groups, such radical including the alkyl groups has from 6 to 18 carbon atoms and B is oxygen or sulphur.

X3) 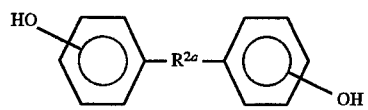

wherein $R^{2a}$ is —SO—, —$SO_2$—, —CO— or a linear or branched alkylene radical containing from 1 to 9 carbon atoms and wherein the H atoms can be partially or wholly substituted with F atoms.

X4) $HOCH_2—R^{3a}—CH_2OH$ wherein $R^{3a}$ is a perfluoropolyethereal or polyfluoroethereal chain, the average molecular weight by number Mn being from 360 to 2,000.

The accelerators forming the cation are described in the art for instance in U.S. Pat. No. 4,259,463 for aminophosphonium compounds, in U.S. Pat. No. 3,712,877 for quaternary phosphonium salts, U.S. Pat. No. 3,655,727 for quaternary ammonium salts, and EP 337705 for class III).

The preferred cations are those deriving from aminophosphonium wherein the phosphorus atom is linked to a nitrogen atom and the other three covalent bonds are formed by organic radicals wherein the carbon is linked to phosphorus. The following compounds can be cited:

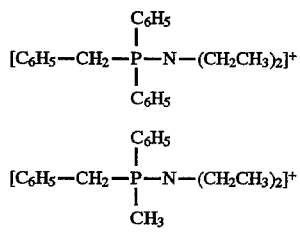

[((CH_3)_2N)_3P—CH_2—CH_3]^+

[((CH_3)_2N)_3P—CH_3]^+

[P(N(CH_3)_2)_2(C_6H_5)_2]^+

[P(N(C_2H_5)_2)_2—(C_6H_5)_2]^+

[P(N(CH_3)_2)_2(C_6H_5(C_6H_5CH_2)]^+

[P(N(C_2H_5)_2)_2(C_6H_5)(C_6H_5CH_2)]^+

[P(N(CH_3)_2)_2(C_6H_5)(CH_3)]^+

[P(N(C_2H_5)_2)_3(C_6H_5CH_2)]^+

The compound 1,1-diphenyl-1benzyl-N-diethytl-phosphoramine is particularly preferred.

Among the quaternary phosphonium compounds it can be cited

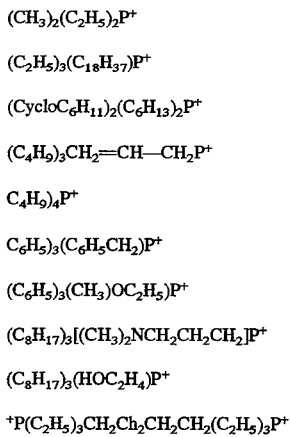

Tetrabutyl phosphonium is particularly preferred. Among anions the bisphenol compounds (class X3), wherein the $R^{2a}$ radical is the perfluoroalkyl group from 3 to 7 carbon atoms, and the OH are in para position, are preferred. The most preferred compound is $R^{2a}=-C(CF_3)_2-$.

The adduct can be prepared as follows.

The polyhydroxy or polythiol compound is reacted, in aqueous solution or in a suitable solvent, for instance methanol, wherein the accelerator is soluble, in a first step, with a basic substance, for instance NaOH, KOH, $Ca(OH)_2$ and $tBuO^-K^+$, by using one equivalent gram of basic substance for mole of accelerator. The reaction product is then reacted in a second step with an accelerator salt, for instance a chloride. The desired salt precipitates. After filtration and drying the product is melted which, through cooling, solidifies in flakes or pellets giving the adduct used in the present invention. This solid form is particularly suitable for its handling and its compounding in the blends.

The polyhydroxy or polythiol compounds are used in molar ratios from 3:1 to 5:1 with respect to the accelerator.

Without being bound to any theory, it seems by IR spectra that the excess of polyhydroxy compound results linked to the cation also when this results in excess with respect to the stoichiometric, as it must be according to the present invention.

Tests carried out by the Applicant have shown that the adducts with excess of bisphenol with respect to the accelerator show superior properties if the amount of curing agent is added in excess during the adduct preparation or after the adduct achievement in molar ratios 1:1 between accelerator and curing agent, before bringing to melting the reaction mixture containing the excess of curing agent.

As a matter of fact if the adduct in molar ratio 1:1 is prepared and the reaction product is melted and only afterwards the desired amount of curing agent is added, the improved results according to the present invention are not obtained.

The curing blend comprises moreover, in order to obtain cured product through heating, a) one or more acceptors of inorganic acids selected among the ones known in ionic vulcanisation of vinylidene fluoride copolymers, in amounts 1–40 parts for 100 parts fluoroelastomeric copolymer;

b) one or more basic compounds selected from those known in ionic vulcanisation of vinylidene fluoride copolymers, in amounts from 0.5 to 10 parts for 100 parts of fluoroelastomeric copolymer.

As also known, the basic compounds of point b) are usually selected from the group consisting of $Ca(OH)_2$, $Sr(OH)_2$, $Ba(OH)_2$, metal salts of weak acids, such as for instance carbonates, benzoates, oxalates and phosphites of Ca, Sr, Ba, Na and K and mixtures of the aforesaid hydroxides with the abovesaid metal salts.

The composition according to the present invention commonly comprises other known components, such as fillers, for instance carbon black, silica and dyes, generally from 5 to 30 phr; and processing adjuvants, for instance plasticizers, generally from 0.1 to 5 phr.

However an advantage according to the present invention consists in that optimum results are obtained without using processing adjuvants, such as sulphones, which generally lead to a worsening of the final properties depending on the used accelerating system.

The fluoroelastomeric copolymers, as said above, are vinylidenefluoride copolymers with one or more fluorinated monomers having ethylene unsaturation. In particular the copolymers of the present invention are VDF copolymers with hexafluoropropene.

Other comonomers having ethylene unsaturation which can be used are vinylethers (PAVE) in amounts from 0 to 9% by weight. The preferred vinylethers are perfluoroalkylperfluorovinylethers, in particular perfluoromethylperfluorovinylether (MVE) and perfluoropropylperfluorovinylether. Utilizable perfluorovinylethers and perfluoroalkoxyvinylethers are described in U.S. Pat. No. 3,291,843.

Other comonomers which can be utilized in amounts from 0 to 10% by weight are for instance tetrafluoroethylene, chlorotrifluoroethylene.

The olefinic monomers generally have up to 4 C atoms and are selected in particular between ethylene (Et) and propene and are used in amounts up to 20% by weight.

The preferred copolymers are, by weight
vinylidenefluoride 55–65%
hexafluoropropene 25–40%
tetrafluoroethylene 0–8%

Alternatively copolymers can be preferably used, formed by (by weight):
40–65% of VDF units
21–36% of HFP units
3–9% of PAVE units
0–8% of TFE units If hydrogenated olefins are used, preferrable compositions are, by weight:
45–60% of VDF units;
28–45% of hexafluoropropene (HFP) and/or hydropentafluoropropene (HFPE) units
0–9% of perfluoroalkylvinylether (PAVE) units
5–15% of an olefin unit containing up to 4 carbon atoms;
0–10% of tetrafluoroethylene (TFE) and/or chlorotrifluoroethylene (CTFE) units.

The fluoroelastomeric copolymers according to the present invention are prepared by emulsion polymerization according to well known techniques, in the presence of radicalic initiators such as for instance persulphates, perphosphates, alkaline or ammonium perborates or percarbonates, optionally in combination with reducing agents such as sulphites, bisulphites, hyposulphites, phosphites, hypophosphites of alkaline or ammonium metals, or in combination with ferrous, cupreous or silver salts, or of other easily oxidable metals. Such methods are described in Kirk Othmer, Encyclopedia of Chemical Technology, vol. 8, pag. 500 and on, 1979. As polymerization methods can be used, in particular, the mass polymerization, that in solution of organic solvents and the one in emulsion or suspension in water.

Surfactants are not necessary, however, if desired, they can be used in low concentrations without giving the disadvantages indicated above. Ammonium perfluorooctanoate can be cited or others known to be suitable in preparing fluoroelastomers can be present in the polymerization medium.

As said, the transfer agents are absent or used in small amounts such as to give copolymers having at least 0.5 ionic terminals for chain. Among chain transfer agents ethyl acetate, ethyl malonate, iodided and/or brominated chain transfer agents, such as for instance the compounds having the general formula $Rf(I)_x(Br)_y$, can be cited, wherein Rf=perfluorinated hydrocarbon radical containing from 1 to 8 carbon atoms, x, y being integers comprised between 0 and 2, with at least one of x or y equal to 1 and x+y is at most 2. It can also be used compounds having some I or Br in the place of F of the perfluorinated hydrocarbon. These compounds are known as polyiodided or polybrominated compounds. Moreover iodides and/or bromides of alkaline or alkaline-earth metals as described in European patent application No. 407937 can be used.

When the polymerization is over, the fluoroelastomer is isolated from the polymeric latex by know methods, such as coagulation by addition of electrolytes or by cooling.

The polymerization reaction is generally carried out at temperatures from 25° C. to 50° C., under pressure up to 10 MPa.

The preparation of the elastomeric copolymers according to the invention can be carried out also by polymerization in the presence of a microemulsion formed by one or more perfluoropolyoxyalkylenes and water, according to the method described in European patent application No. 250767.

The polymerization can be carried out also by using, instead of a microemulsion, an emulsion or a dispersion of perfluoropolyoxyalkylenes and water according to the method described in U.S. Pat. No. 4,789,717.

Also the emulsions and dispersions of perfluorooxyalkylenes and water described for instance in European patent applications Nos. 196904, 280312 and 360292, can be used for this purpose.

For the curing of the polymers of the invention the elastomeric composition must be heated under pressure, at a temperature from 130° C. to 230° C., preferably from 160° C. to 200° C., for a period of time comprised from 0.5 to 60 minutes and, preferably from 1 to 15 minutes. The obtained manufactured articles can then be post-cured in stove or in oven, at atmospheric pressure, at a temperature from 130° to 300° C., preferably from 200° C. to 275° C., for a period of time from 5 to 48 hours, and, preferably, from 10 to 24 hours.

The following examples are given for illustrative purpose but do not limit the scope of the present invention.

EXAMPLES

Preparation of the adduct 2 adducts according to the present invention are prepared by starting from the accelerator indicated below and from the bisphenol AF (BAF):

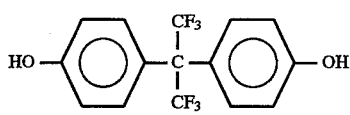

The accelerator has the following formula:

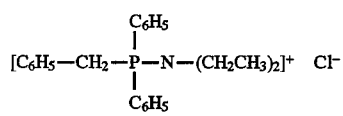

The preparation of the adduct produced starting from one accelerator mole and 5 (3 or 4 moles in case of 1:3 or 1:4 ratio) gives the adduct 1:5 (1:3 or 1:4 respectively).

In a 10 l glass reactor, equipped with a dropping funnel and a stirrer, 352.8 g (1.05 moles) of bisphenol AF are dispersed under stirring into 5 l of water. A solution of 8.4 g (0.21 moles) of NaOH in 500 cc of water is then quickly dropped in the reactor. The reactor is kept under stirring at room temperature for 30 minutes. Then a solution of 80.5 g (0.21 moles) of amino-phosphonium dissolved in 800 cc of water is dropped under stirring in the reactor. A very thick suspension is obtained; it is kept under stirring at room temperature for 2 hours; then it is let to stay for about 4 hours. It is filtered on cloth and washed twice with overall 2 l of water. It is dried in a vacuum stove to 50°–60° C. for 20 hours and then the reaction mixture is brought to melt by heating at 100°–120° C. and it is allowed to cool, thus obtaining the adduct 1:5 according to the present invention.

EXAMPLES 1–2 (comparative)

In Table 1 the formulation of 2 blends is reported, wherein in the blend 1 an adduct according to the present invention was not used, but, separately, the accelerator and the bisphenol AF; in the blend 2 the adduct prepared according to the present invention was utilized.

The fluoroelastomer is TECNOFLON®NM A2 of Ausimont vinylidene fluoride and hexafluoropropene copolymer in weight ratio 63:37, having a Mooney viscosity ML (1+4) at 100° C. equal to 85, obtained by using a persulphate initiator and a chain transfer agent, the fluoroelastomer having a number of ionic terminals of 0.3 for chain.

TABLE 1

| COMPOUNDS FORMULATION | | |
|---|---|---|
|  | COMPOUND 1 (cfr) (phr) | COMPOUND 2 (cfr) (phr) |
| Fluoroelastomer NMA2 | 100 | 100 |
| Accelerator | 0.5 | — |
| Bisphenol AF | 2.0 | — |
| Adduct I (1 mole:4 moles) | — | 2.0 |
| MgO | 3 | 3 |
| Ca(OH)$_2$ | 6 | 6 |
| MT Black | 30 | 30 |

These blends were cured at 170° C. in press and then to a post-curing in air stove between 200° C. and 250° C. for 24 hours.

The curing evaluation was carried out by oscillating disc rheometer (ODR) of Monsanto type according to ASTM D 2084/ 81.

The data relating to the viscosity compound, the curing characteristics and the mechanical properties are reported in Table 1A.

TABLE 1A

| characteristics of the compounds of Table 1. | | |
|---|---|---|
|  | Ex 1 (cfr) | Ex 2 (cfr) |
| Rheometric properties | | |
| Mooney Viscosity (ASTM D 1646-82 ML(1 + 10) at 121° C. (in Mooney) | 76 | 73 |
| Mooney Scorch at 135° C. Minimum Viscosity (in Mooney) | 32 | 32 |
| Time for increasing of 15 points the viscosity (minutes) | 36'5" | 27'42" |
| ODR 12' at 177° C. Arc+/−3° (ASTM D2084-81) | | |
| ML (lbf · in) | 12 | 12 |
| MH (lbf · in) | 111 | 97 |
| ts2 (sec) | 127 | 100 |
| t90 (sec) | 205 | 130 |
| V$_{max}$ (lbf · in/sec) | 3.1 | 4.3 |
| Mechanical properties (ASDTM D412-83) Post cured @ 250° C. × 8 + 16 hours | | |
| Modulus 100% (MPa) | 7.0 | 6.0 |
| Tensile strength (MPa) | 15.3 | 14.1 |
| Elongation at break (%) | 169 | 180 |
| Hardness Shore A | 75 | 73 |
| Compression Set 70 h at 200° C. (ASTM D 395 Method B) | | |
| O-rings 214 (%) | 17 | 17 |

As shown by the reported data, the use of the adduct with respect to the use of the curing agent and of the accelerator, separately, does not lead to meaningful variations of the elastomeric properties while the mechanical properties are worsened.

No notable variation of viscosity is determined at 121° C., instead the polymer scorchability has increased (time for increasing the viscosity of 15 points).

EXAMPLES 3–5

A fluoroelastomeric copolymer TECNOFLON®NML of Ausimont is used, whose composition is:

| VDF | 62% by weight |
|---|---|
| HFP | 38% by weight |
| (Fluorine 65.7% by weight) | | having a Mooney viscosity ML(1+10) at 121° C. equal to 21 and having 0.8 ionic terminals per chain.

The formulation of 3 blends is reported in Table 2, the first of which is a comparative blend (Ex. 3) and is a composition wherein no adduct according to the present invention was used but, separately, the accelerator and the bisphenol AF. In examples 4 and 5 the adduct prepared according to the present invention was used.

The data relating to the rheometric properties, to the curing characteristics and the mechanical properties are reported in Table 2A.

TABLE 2

COMPOUND FORMULATION

|  | Ex. 3 (cfr) (phr) | Ex. 4 (phr) | Ex. 5 (phr) |
|---|---|---|---|
| Fluoroelastomer | 100 | 100 | 100 |
| Bisphenol AF | 1.5 | — | — |
| Accelerator (I) | 0.5 | — | 0.3 |
| Adduct II | — | 2 | — |
| Adduct (III) | — | — | 1.8 |
| MgO | 3 | 3 | 3 |
| Ca(OH)$_2$ | 6 | 6 | 6 |
| MT Black | 30 | 30 | 30 |

Accelerator (I): [Ph$_2$P—N—(CH$_2$CH$_3$)$_2$]$^+$Cl$^-$    Ph = C$_6$H$_5$
                      |
                      CH$_2$Ph Adduct (II): molar ratio accelerator/bisphenol 1:3 obtained by melting of the reaction mixture.
Adduct (III): molar ratio accelerator/bisphenol 1:5 obtained by melting of the reaction mixture.

TABLE 2A characteristics of the compounds of Table 2.

|  | Ex 3 (cfr) | Ex. 4 | Ex. 5 |
|---|---|---|---|
| Rheometric properties (ASTM D 1646-82) |  |  |  |
| Mooney Viscosity ML(1 + 10) at 121° C. (Mooney) | 57 | 42 | 44 |
| Curing characteristics (ASTM D2084-81) ODR 12' at 177° C., Arc +/−3° |  |  |  |
| ML (lbf · in) | 7 | 6 | 5 |
| MH (lbf · in) | 92 | 103 | 97 |
| ts2 (sec) | 135 | 126 | 152 |
| t90 (sec) | 354 | 324 | 287 |
| v$_{max}$ (lbf · in/sec) | 1.3 | 1.8 | 1.6 |
| Mechanical properties (ASTM D412-83) After post curing at 230° C. × 8 + 16 hours |  |  |  |
| Modulus 100% (MPa) | 6.4 | 6.9 | 6.7 |
| Tensile strength (MPa) | 15.2 | 14.5 | 16.0 |
| Elongation at break (%) | 176 | 160 | 176 |
| Hardness Shore A | 73 | 74 | 73 |
| Elastic properties Compression Set at 200° C. × 70 h (ASTM D 395 Method B) |  |  |  |
| O-rings 214 (%) | 25 | 22 | 21 |

From the obtained results it is noticed that the viscosity decreases, indicating an improved processability; the curing shows a greater crosslinking yield (MH-ML) and higher curing rate. The balance of the mechanical properties is satisfactory.

The compression set is improved.

EXAMPLES 6–8

Examples 3–5 were repeated but using TECNOFLON®BRX of Ausimont, as fluoroelastomer, whose composition is:

| | |
|---|---|
| VDF | 58.4% by weight |
| HFP | 31.0% by weight |
| MVE | 9.0% by weight |
| E | 1.6% by weight |

(Fluorine 64.4% by weight), having a Mooney viscosity ML(1 + 10) at 121° C. equal to 34 and having 0.7 ionic terminals per chain.

The formulations are reported in Table 3 and the compound characteristics in Table 3A. Example 6 is a comparative example.

TABLE 3

COMPOUND FORMULATION

|  | Ex. 6 (cfr) (phr) | Ex. 7 (phr) | Ex. 8 (phr) |
|---|---|---|---|
| Fluoroelastomer | 100 | 100 | 100 |
| Bisphenol AF | 1.5 | — | — |
| Accelerator (I) | 0.65 | — | 0.3 |
| Adduct (II) | — | 2 | — |
| Adduct (III) | — | — | 1.8 |
| MgO | 3 | 3 | 3 |
| Ca(OH)$_2$ | 6 | 6 | 6 |
| MT Black | 30 | 30 | 30 |

TABLE 3A characteristics of the compounds of Table 3

|  | Ex 6 (cfr) | Ex. 7 | Ex. 8 |
|---|---|---|---|
| Rheometric properties (ASTM D 1646-82) |  |  |  |
| Mooney Viscosity ML(1 + 10) at 121° C. (Mooney) | 68 | 56 | 60 |
| Mooney Scorch at 135° C. | 30 | 25 | 28 |
| Minimum Viscosity (Mooney) |  |  |  |
| Time for increasing of 15 points the viscosity (min) | 21'5" | 24' | 27'15" |
| Curing characteristics (ASTM D2084-81) ODR 12' at 177° C., Arc +/−3° |  |  |  |
| ML (lbf · in) | 10 | 10 | 10 |
| MH (lbf · in) | 85 | 94 | 89 |
| ts2 (sec) | 150 | 108 | 132 |
| t90 (sec) | 333 | 225 | 270 |
| v$_{max}$ (lbf · in/sec) | 1.5 | 2.5 | 1.9 |
| Mechanical properties (ASTM D412-83) After post curing at 230° C. × 8 + 16 hours |  |  |  |
| Modulus 100% (MPa) | 5.2 | 6.3 | 5.8 |
| Tensile strength (MPa) | 15 | 15.3 | 16 |
| Elongation at break (%) | 194 | 213 | 199 |
| Hardness Shore A | 69 | 70 | 71 |
| Compression Set at 200° C. × 70 h (ASTM D 395 Method B) |  |  |  |
| O-rings 214 (%) | 25 | 22 | 21 |

The results show the same previous trends, it is noticed indeed a decrease in the blend viscosity, an increase in the yield and in curing rate, a better balance of the mechanical properties and lower compression set.

We claim:

1. A curable fluoroelastomeric composition comprising:

A) 100 parts (phr) of a curable fluoroelastomeric copolymer having a content in F<67% by weight and comprising from 40 to 68% by weight of VDF units, from 20 to 50% by weight of HFP units, said copolymer having a number of ionic terminals of at least 0.5 for chain;

B) from 1 to 5 parts (phr) of an adduct between an accelerator and a curing agent, the accelerator being an onio-organic compound having a positive charge, the curing agent being a di-or polyhydroxy or di- or polythiol compound; the adduct being obtained by melting of the reaction product between accelerator and curing agent in a molar ratio from 1:3 to 1:5, or by melting of the adduct mixture having said accelerator and said curing agent in a molar ratio of 1:1 added with excess curing agent to produce a molar ratio of 1:3 to 1:5.

2. Compositions according to claim 1 wherein the other comonomers are from 0 to 10% by weight of TFE, from 0 to 9% by weight of perfluoroalkylvinylethers (PAVE) and from 0 to 20% by weight of an hydrogenated olefin containing up to 4 carbon atoms.

3. Compositions according to claim 1 wherein B) is from 2 to 4.5 phr.

4. Compositions according to claim 1 wherein the accelerator forming the adduct cation is selected from the following classes:

I) aminophosphonium $[P(NR'R'')_n(R^1\ R^2\ R^3)_{4-n}]^+$ wherein n is an integer from 1 to 3;

R', R" and $R^1\ R^2\ R^3$, equal or different from each other, are alkylic, cycloalkylic, arylic, arylalkylic, oxyalkylic or polyoxyalkylic groups having a free or esterified terminal —OH function;

R' and R" contain from 1 to 7 carbon atoms and can be linked each other so as to form an heterocyclic ring with the nitrogen atom while $R^1$, $R^2$, $R^3$ equal or different from each other contain from 1 to 18 carbon atoms;

II) compounds having the formula

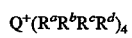

wherein Q is selected from nitrogen, phosphorus, arsenic, antimonium;

III Compounds having the formula:

wherein in II) and III) $R^a$, $R^b$, $R^c$, $R^d$ are selected from alkyls, aryls, alkylaryls or their combinations, two of said free radicals can be linked each other and the Q or S atom can form an heterocyclic ring.

5. Compositions according to claim 4 wherein the accelerator is selected from the quaternary phosphonium compounds containing at least a phosphorus atom linked with four simple covalent bonds to four organic radicals, the organic radicals generally containing from 1 to 30 carbon atoms, the organic radical, being linear or branched, optionally containing heteroatoms; or from aminophosphonium derivatives wherein the phosphorus atom is linked to a nitrogen atom and the other three covalent bonds are formed by organic radicals wherein the carbon is bound to phosphorus.

6. Compositions according to claim 1 wherein the anion obtained from the curing agent is selected from the polyhydroxy or polythiol compound from the following classes:

X1) $A(BH)_m$ wherein A is an arylene radical optionally substituted with alkylic groups, such radical including the alkyl groups has from 6 to 14 carbon atoms, B is oxygen or sulphur and m is equal to 2 or 3.

X2) HB—$R^{4a}$—BH wherein $R^{4a}$ is an akylene or cycloalkylene radical optionally substituted with alkylic groups, such radical including the alkyl groups has from 6 to 18 carbon atoms and B is oxygen or sulphur.

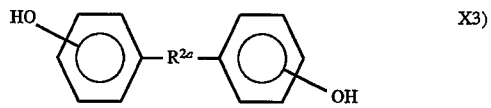

wherein $R^{2a}$ is —SO—, —$SO_2$—, —CO— or a linear or branched alkylene radical containing from 1 to 9 carbon atoms and wherein the H atoms can be partially or wholly substituted with F atoms.

X4) $HOCH_2$—$R^{3a}$—$CH_2OH$ wherein $R^{3a}$ is a perfluoropolyether or polyfluoroether chain, the average molecular weight by number Mn ranging from 360 to 2,000.

7. Compositions according to claim 1 wherein it is present also a) one or more acceptors of inorganic acids selected from those known in ionic curing of vinylidene fluoride copolymers, in amounts 1–40 parts for 100 parts fluoroelastomeric copolymer;

b) one or more basic compounds selected from those known in ionic curing of vinylidenefluoride copolymers, in amounts from 0.5 to 10 parts for 100 parts of fluoroelastomeric copolymer.

8. Compositions according to claim 1 wherein the monomeric units are, by weight vinylidene fluoride 55–65% hexafluoropropene 25–40% tetrafluoroethylene 0–8%.

9. Compositions according to claim 1, wherein the monomeric units are (by weight):

| | |
|---|---|
| VDF | 40–65% |
| HFP | 21–36% |
| PAVE | 3–9% |
| TFE | 0–8%. |

10. Compositions according to claim 1, wherein the monomeric units are (by weight):

| | |
|---|---|
| VDF | 45–60% |
| HFP and/or HFPE | 28–45% |
| PAVE | 0–9% |
| 1–4 C olefin | 5–15% |
| TFE and/or CTFE | 0–10%. |

11. Cured fluoroelastomertic compositions according to claim 7, wherein the curing is obtained by heating the curable fluoroelastomeric compositions.

12. A method which comprises preparing an O-ring from a composition according to claim 1.

13. A method which comprises preparing an O-rings from the fluoroelastomeric composition according to claim 8.

14. A method which comprises preparing an O-ring from a composition according to claim 9.

15. A curable fluoroelastomeric compound according to claim 1 wherein the accelerator indicated in B) is an amount from 0.05 to 0.5 phr.

16. A curable fluoroelastomeric composition according to claim 1, wherein the curable fluoroelastomeric copolymer further comprises one or more comonomers having ethylene unsaturation.

* * * * *

UNITED STATES PATENT AND TRADEMARK OFFICE
CERTIFICATE OF CORRECTION

PATENT NO.   : 5,648,429
DATED        : July 15, 1997
INVENTORS    : Graziella Chiodini
               Vincenzo Arcella It is certified that error appears in the above-identified patent and that said Letters Patent is hereby corrected as shown below:

Claim 4, column 11, line 30 after "linked" insert --to--; and

Claim 4, column 11, line 47, after "linked" insert --to --.

Signed and Sealed this

Seventeenth Day of February, 1998

Attest:

BRUCE LEHMAN

*Attesting Officer*   *Commissioner of Patents and Trademarks*